(12) United States Patent
Yanagita

(10) Patent No.: US 8,040,552 B2
(45) Date of Patent: Oct. 18, 2011

(54) VARIABLE DATA IMAGE GENERATING DEVICE, VARIABLE DATA IMAGE FORMING SYSTEM AND COMPUTER READABLE STORAGE MEDIUM

(75) Inventor: Hiroshi Yanagita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 877 days.

(21) Appl. No.: 11/759,425

(22) Filed: Jun. 7, 2007

(65) Prior Publication Data

US 2008/0158575 A1    Jul. 3, 2008

(30) Foreign Application Priority Data

Dec. 28, 2006    (JP) ................. 2006-354308

(51) Int. Cl.
*G06K 15/00*    (2006.01)
(52) U.S. Cl. ...... 358/1.18; 358/1.15; 345/619; 715/210; 715/211
(58) Field of Classification Search ................. 358/1.18, 358/1.1, 1.15; 345/619, 625; 711/118; 715/210, 715/211
See application file for complete search history.

(56) References Cited

U.S. PATENT DOCUMENTS

| | | | | |
|---|---|---|---|---|
| 5,596,416 A | * | 1/1997 | Barry et al. | 358/296 |
| 2005/0094191 A1 | * | 5/2005 | Vondran et al. | 358/1.15 |
| 2005/0094194 A1 | * | 5/2005 | Dolev et al. | 358/1.15 |
| 2006/0136809 A1 | * | 6/2006 | Fernstrom | 715/505 |
| 2006/0221371 A1 | * | 10/2006 | Ogasawara | 358/1.13 |

FOREIGN PATENT DOCUMENTS

| | | |
|---|---|---|
| JP | 63108428 | 5/1988 |
| JP | 1196661 | 8/1989 |
| JP | 3228188 | 10/1991 |
| JP | 08230245 | 10/1996 |
| JP | 2001202227 | 7/2001 |

* cited by examiner

*Primary Examiner* — Chan S Park
*Assistant Examiner* — David S. Cammack
(74) *Attorney, Agent, or Firm* — Gesmer Updegrove LLP

(57) ABSTRACT

There is provided a variable data image generating device including a plurality of first type image generating units that execute a first rendering instruction for a distributed record and generates a first type image corresponding to the record; a first type image memory that stores the first type image corresponding to each record generated by each of the first image generating units; a distributing unit that distributes a record in variable data to each of the first type image generating units; and a document image generating unit that executes a drawing program including one or more instructions for each record in the variable data, wherein the document image generating unit generates a document image for each record by obtaining the first type image corresponding to the record from the first type image memory and laying out the obtained image in response to the first rendering instruction in the rendering program.

5 Claims, 9 Drawing Sheets

| LAYOUT IDENTIFIER | LAYOUT PROGRAM |
|---|---|
| Layout0001 | 100 100 MOVETO % CURRENT DRAWING POSITION CHANGING COMMAND<br>UserID SHL % CHARACTER RENDERING COMMAND, RENDERS DATA OF UserID ITEM<br>100 200 MOVETO % CURRENT DRAWING POSITION CHANGING COMMAND<br>[ [(ASSET A) AssetA ] [(ASSET B) AssetB] [(ASSET C) AssetC] 100 100 ] DRAWPIE % PIE CHART DRAWING COMMAND<br>PAGEBRK % PAGE IMAGE GENERATING COMMAND |
| ⋯⋯ | ⋯⋯ |

Fig. 2

| KEY | GRAPH IMAGE |
|---|---|
| [ [(ASSET A) 10000 ] [(ASSET B) 20000] [(ASSET C) 30000] 100 100 ] DRAWPIE |  |
| [ [(ASSET A) 20000 ] [(ASSET B) 30000] [(ASSET C) 10000] 100 100 ] DRAWPIE |  |
| ....... | ....... |

VARIABLE DATA IMAGE GENERATING DEVICE, VARIABLE DATA IMAGE FORMING SYSTEM AND COMPUTER READABLE STORAGE MEDIUM

CROSS-REFERENCE TO RELATED APPLICATIONS

This application is based on, and claims priority under 35 USC 119 from, Japanese Patent Application No. 2006-354308 filed on Dec. 28, 2006.

BACKGROUND

1. Technical Field

The present invention relates to a variable data image generating device, a variable data image forming system and a storage medium.

2. Related Art

A variable data printing technique for printing an object by replacing the contents for each object in conjunction with a database is known. The variable data printing may also be called variable printing. In recent variable data printing, not only a simple character string such as a destination address but also a graph or other complicated images can be replaced according to a record of the database.

SUMMARY

According to an aspect of the present invention, there is provided a variable data image generating device including a plurality of first type image generating units that execute a first rendering instruction for a distributed record and generates a first type image corresponding to the record; a first type image memory that stores the first type image corresponding to each record generated by each of the first image generating units; a distributing unit that distributes a record included in variable data to be processed to each of the first type image generating units; and a document image generating unit that executes a drawing program including one or more instructions for each record in the variable data, wherein the document image generating unit generates a document image for each record by obtaining the first type image corresponding to the record from the first type image memory and laying out the obtained first type image in response to the first rendering instruction in the rendering program instead of executing the first rendering instruction.

BRIEF DESCRIPTION OF THE DRAWINGS

Exemplary embodiments of the present invention will be described in detail based on the following figures, wherein:

FIG. 2 is a diagram showing how a layout program is managed in a layout program managing unit;

DETAILED DESCRIPTION

Figure 1:
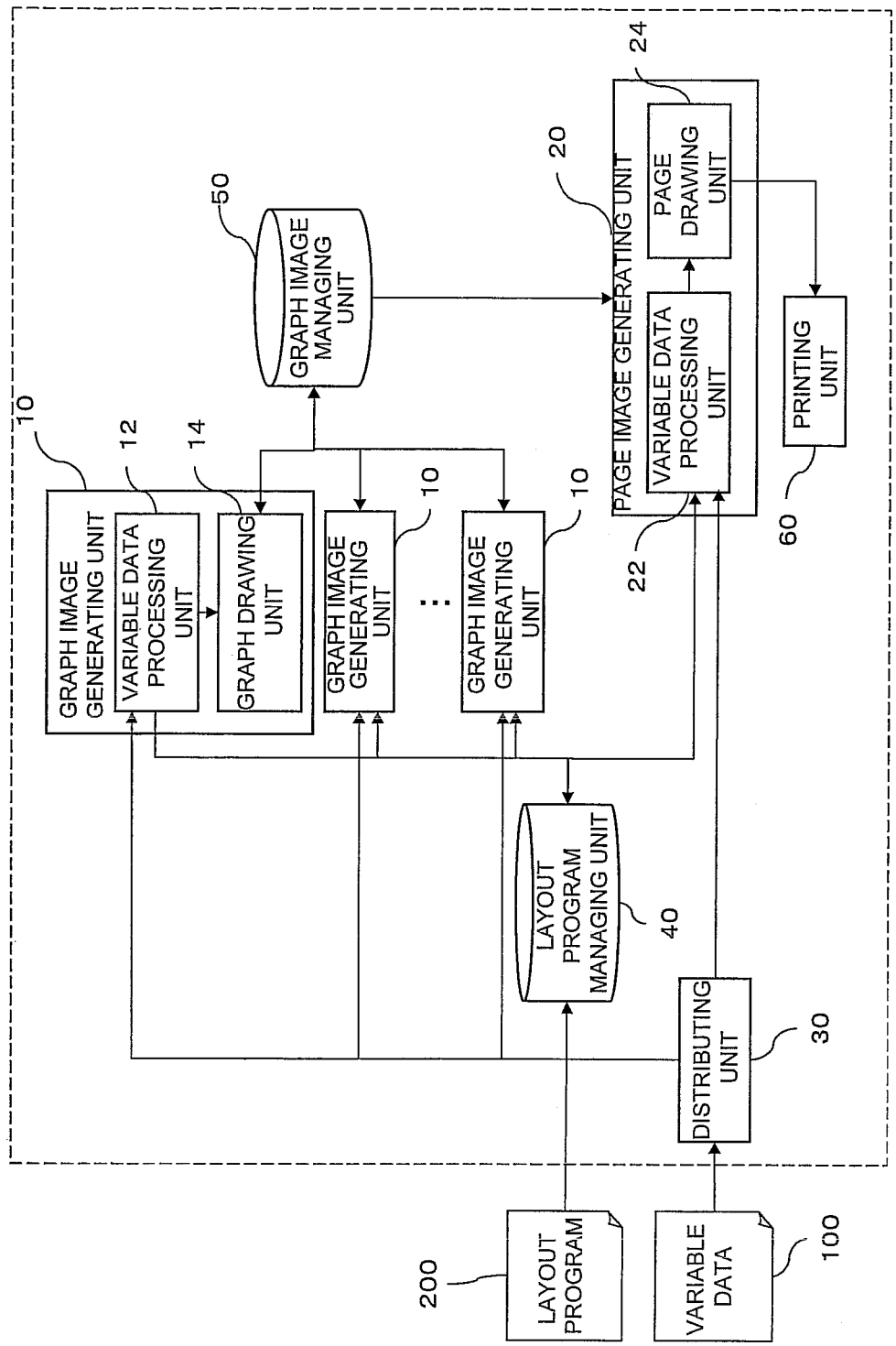
FIG. 1 is a diagram showing an example of a device configuration of an exemplary embodiment.

First, an example of an image forming device of an exemplary embodiment will be described with reference to FIG. 1. The image forming device of the example generates a printing image including a graph image according to an information record (hereinafter, referred to as record) for each information record. Variable data 100, including plural records, and a layout program 200 in which commands for converting a record into a printing image are described, are input to the image forming device.

The layout program 200 includes a command for rendering an image other than a graph such as a command for rendering text, for example, and a command for instructing a position in a printing image of an image object such as the graph or text, for example, in addition to a graph drawing command for instructing to draw a graph image. In the example, the printing image for each record will include a graph image according to each record. The layout program 200 may include a command for instructing to draw a fixed image object that is also included in a printing image of every record other than a command for drawing an variable image object for each record. As mentioned above, the layout program 200 can include the following commands.

a) Command for converting a record into a predetermined format b) Command for converting fixed data into a predetermined format c) Command for drawing or rendering the converted data of the format at a current drawing position as a character, a graph, or another image object d) Command for changing the current drawing position based on the converted data FIG. 2 shows an example of a layout program. The layout program of the exemplified layout identifier [Layout0001] shows processing for drawing a value of an item of "User ID" in a record with a coordinate (100, 100) as a starting point, then drawing a pie chart of 100×100 pixels with a coordinate (100, 200) as a starting point, and outputting the drawn result as a printing image. The pie chart to be generated is a graph in the form of a circle that is divided according to values in items of an "Asset A", an "Asset B" and an "Asset C" in the record.

Returning to FIG. 1, the input layout program 200 is stored in the layout program managing unit 40. The stored layout program 200 is identified by the layout identifier. The layout program managing unit 40 provides the layout program 200 corresponding to the layout identifier in response to a request designating the layout identifier from a graph image generating unit 10 and a page image generating unit 20.

The image forming device has plural graph image generating units 10 and a page image generating unit 20. The graph image generating units 10 generate a graph image according to the data item in a record. The page image generating unit 20 generates a printing image corresponding to a record. The printing image corresponding to a record includes a graph image of the record. In the exemplary embodiment, efficiency of the entire printing processing is improved by processing the graph drawing, that requires a relatively long time, in parallel using plural graph image generating units 10.

Figure 3:
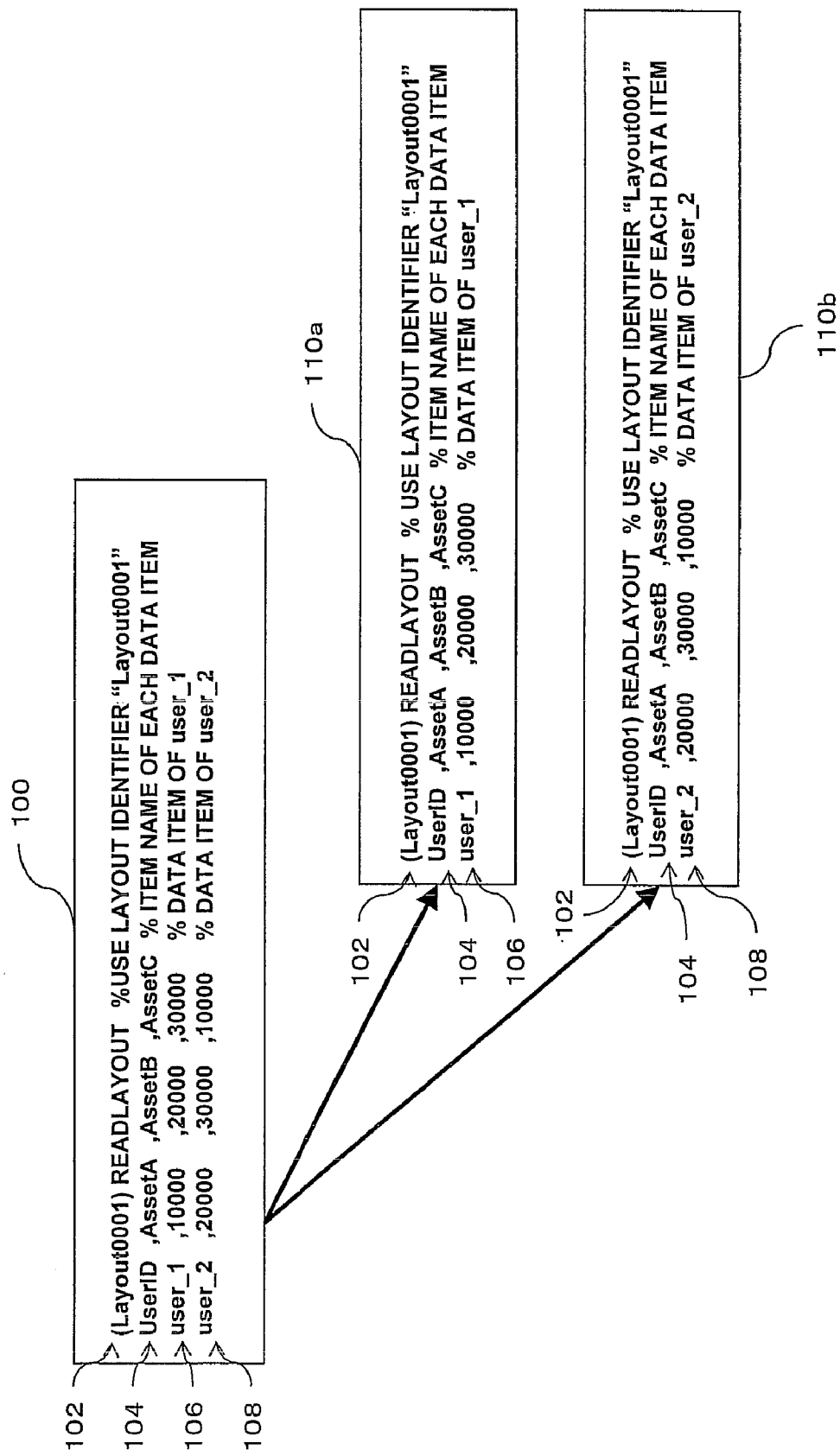
FIG. 3 is a diagram for illustrating an example of dividing variable data.

A distributing unit 30 distributes the whole of the input variable data 100 to the page image generating unit 20, while dividing the variable data 100 for respective records and distributing them to the graph image generating units 10. For example, a case where the variable data 100 exemplified in FIG. 3 is input will be examined. In the first line of the variable data 100, a layout instruction command 102 indicating that a layout program of the layout identifier [Layout0001] is used is described. In the second line, a definition 104 of a record including four items of "UserID", "AssetA", "AssetB" and "AssetC" is described in the CSV form. In the third and fourth lines, records of two users are described in the CSV form. The records may be described in a form other than the CSV form. When the distributing unit 30 is supplied with such variable data 100, it divides the data into divided pieces of data 110a, 110b for each record. As the divided pieces of data 110a and 110b include the layout instruction command 102 and the record definition 104 respectively, a single piece of each data can be interpreted by itself. The divided piece of data 110a further includes a record 106, and the divided piece of data 110b further includes a record 108. The example of FIG. 3 shows a case where two records are included in the variable data 100, but if more records are included in the variable data 100, divided pieces of data are generated in the same way as the variable data 100 is divided for each record, and the layout instruction command 102 and the record definition 104 are added to the divided pieces.

The distributing unit 30 generates divided pieces of data 110a, 110b . . . by dividing the variable data 100 in order from the first record, and distributes the divided pieces of data-among respective graph image generating units 10 using the round-robin method, for example, in order from the first record. If there are two graph image generating units 10, for example, the odd-numbered divided records such as first, third, fifth . . . are distributed into the first graph image generating unit 10, and the even-numbered divided records such as second, fourth, sixth . . . are distributed into the second graph image generating unit 10, in order.

Although the variable data 100 is divided into units of one record in the above mentioned example, the variable data 100 may be divided into units of more than one.

Figure 4:
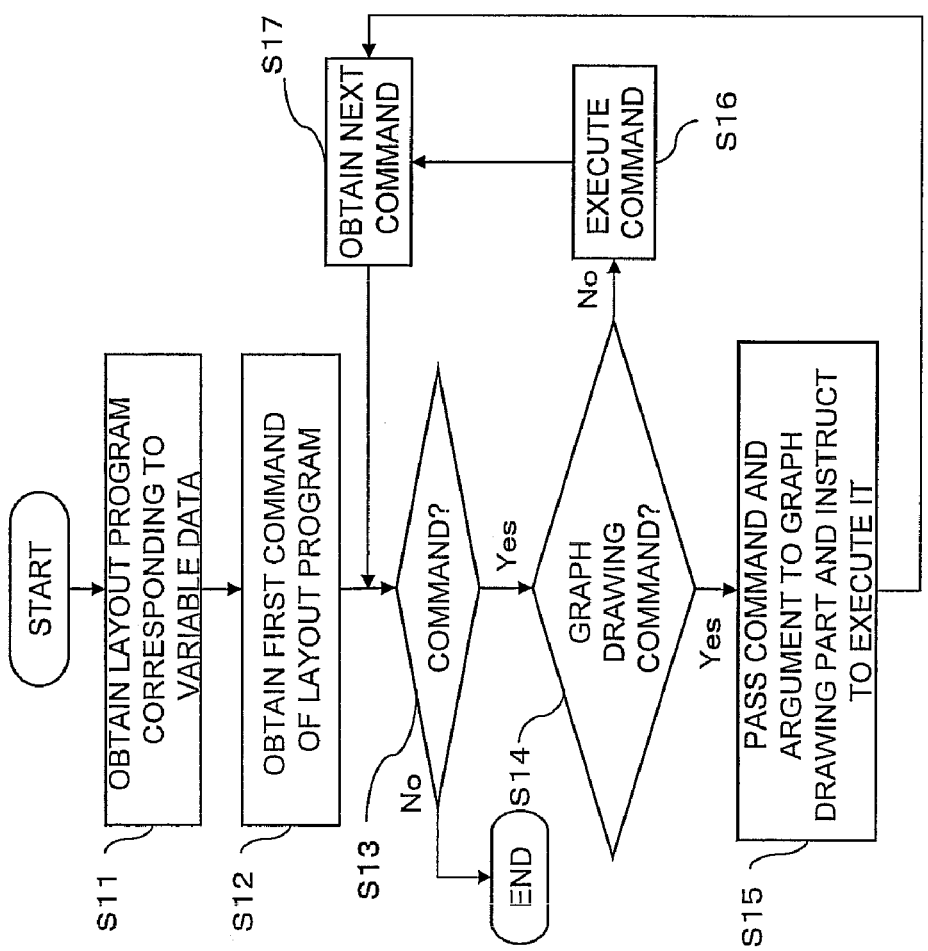
FIG. 4 is a flowchart showing an exemplary procedure of a variable data processing unit in a graph image generating unit.

Each graph image generating unit 10 has the variable data processing unit 12 and the graph drawing unit 14. The variable data processing unit 12 applies the layout program to the divided pieces of data 110a, 110b . . . received from the distributing unit 30. The procedure of the variable data processing unit 12 is shown in FIG. 4.

In the procedure, the variable data processing unit 12 passes the layout identifier in the received divided piece of data to the layout program managing unit 40 and obtains the layout program corresponding to the identifier (S11). Then the variable data processing unit 12 obtains the first command in the layout program (S12) and determines whether the command is a graph drawing command or not (S14). If the command obtained from the layout program is not a graph drawing command, the variable data processing unit 12 simulate execution of the command (S16). If the obtained command is not a graph drawing command that is served by the graph drawing unit 14, such as a command for moving the current drawing position or the like, simulation of execution of the obtained command is performed at step S16. In the simulation at step S16, if the obtained command is a command for instructing to draw an image, the actual drawing of the image is omitted. At the step S16, internal control variables for determining the contents to be drawn for a printing image are changed according to the simulation of the execution of the command. The internal state of the variable data processing unit 12 changes according to the simulated execution of the command. As the variable data processing unit 12 executes the layout program in order from the top, internal states that may affect drawing a graph image later may be correctly updated. After the execution, the processing proceeds to step S17.

If the command to be executed is determined as a graph drawing command served by the graph drawing unit 14 in the determination at step S14, a value of each item in the records in the divided pieces of data is set to an argument of the graph drawing command, and a set of the graph drawing command and the argument is passed to the graph drawing command unit 14 to be executed (S15).

The graph drawing command unit 14 makes the set of the received graph drawing command and the argument a graph image identifying key, and interrogates the graph image managing unit 50 as to the presence of a graph image corresponding to the key. The graph image managing unit 50 returns a truth-value indicating whether or not it stores the graph image corresponding to the received key to the graph drawing unit 14. If the inquired graph image is in the graph image managing unit 50, the graph drawing unit 14 does nothing but finish the processing and inform the variable data processing unit 12 upon the completion of the processing. If the queried graph image is not in the graph image managing unit 50, the graph drawing unit 14 generates a graph image by executing the graph drawing command indicated by the graph image identifying key with an argument, registers the generated graph image in the graph image managing unit 50 in association with the graph image identifying key and informs the variable data processing unit 12 upon the completion of the processing.

Figure 5:
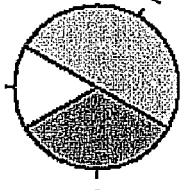
FIG. 5 is a diagram showing an example of the data contents of the graph image managing unit.
Figure 5:
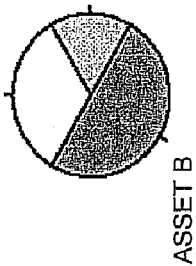

If the graph drawing unit 14 executes the pie chart drawing command in the fourth line of the layout program Layout0001 shown in FIG. 2 for a record in the divided piece of data 110a in FIG. 3, the graph image is registered in the graph image managing unit 50 in association with the graph image identifying key "[[(asset A) 10000][(asset B)20000][(asset C)30000]100 100] DRAWPIE" as shown in FIG. 5.

As such, if a set of the graph drawing command and an argument received from the variable data processing unit 12 represents the same image as the graph image that has been created by any of the graph image generating units 10, the graph drawing unit 14 does not execute the graph drawing command.

When the variable data processing unit 12 is informed of the completion of the processing from the graph drawing unit 14, the processing proceeds to step S17.

At step S17, the variable data processing unit 12 tries to obtain the next command from the layout program. Here, it determines whether the next command is obtained or not (S13). If the next command cannot be obtained, it means that the processing completed to the end of the layout program. Then, the variable data processing unit 12 finishes the processing. If the next command can be obtained, the variable data processing unit 12 repeats the processing after step S14.

Each graph image generating unit 10 executes the above mentioned processing each time it receives a divided piece of data from the distributing unit 30.

Figure 6:
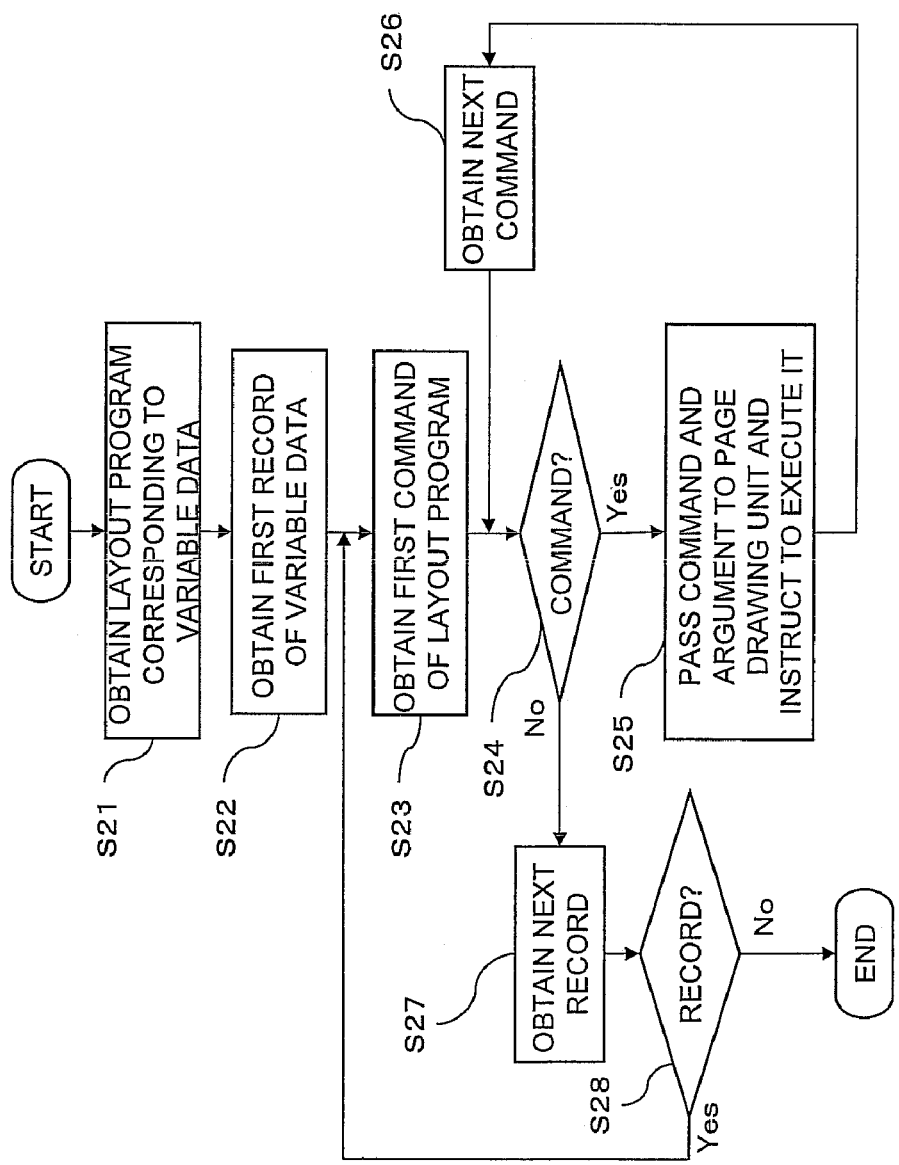
FIG. 6 is a flowchart showing an example of a procedure of a variable data processing unit in a page image generating unit.

Now, the page image generating unit 20 will be described. The page image generating unit 20 has a variable data processing unit 22 and a page drawing unit 24. The variable data processing unit 22 applies the layout program for each record in the variable data 100 received from the distributing unit 30. The procedure of the variable data processing unit 22 is shown in FIG. 6.

In the procedure, the variable data processing unit 22 passes the layout identifier in the variable data 100 received from the distributing unit 30 to the layout program managing unit 40 and obtains the layout program corresponding to the identifier (S21). Then, the variable data processing unit 22 obtains the first record of the variable data 100 (S22). Next, it obtains the first command and an argument in the layout program (S23), and passes the command and the argument to the page drawing unit 24 to be executed (S25). If the arguments of the command described in the layout program are variables, which match the items of the record obtained at steps S22 and S26, the values of the items are set to the argument. In one example, the arguments of the command may be variables that change according to the progression of the processing of the variable data 100. If the command is a command for drawing the page number on the print page image, for example, the argument is incremented each time the page drawing unit 24 draws a page. There are commands for printing an identifying code for each page or each record, as a code for examination of the printed result or identification of a printing material at a later stage. For such commands, an argument changes according to a predetermined rule for each page or each record. If an argument is decided according to a record or a page as shown above, the variable data processing unit 22 manages the argument and passes it to the page drawing unit 24.

When the variable data processing unit 22 instructs the page drawing unit 24 to execute the command, it obtains the next command from the layout program (S26). Here, it is determined whether or not the next command can be obtained (S24). If it can be obtained, the processing at steps S25 and S26 is repeated. If it cannot be obtained, it means that the processing completed to the end of the layout program, and thus the variable data processing unit 22 tries to obtain the next record from the variable data 100 (S27). Here, it is determined whether or not the next record can be obtained (S28). If it can be obtained, the processing returns to step S23 and the processing is performed from the top of the layout program for the obtained record. If it cannot be obtained, it means that the processing completed to the end of the variable date 100, and thus the processing for the variable data 100 completes.

Figure 7:
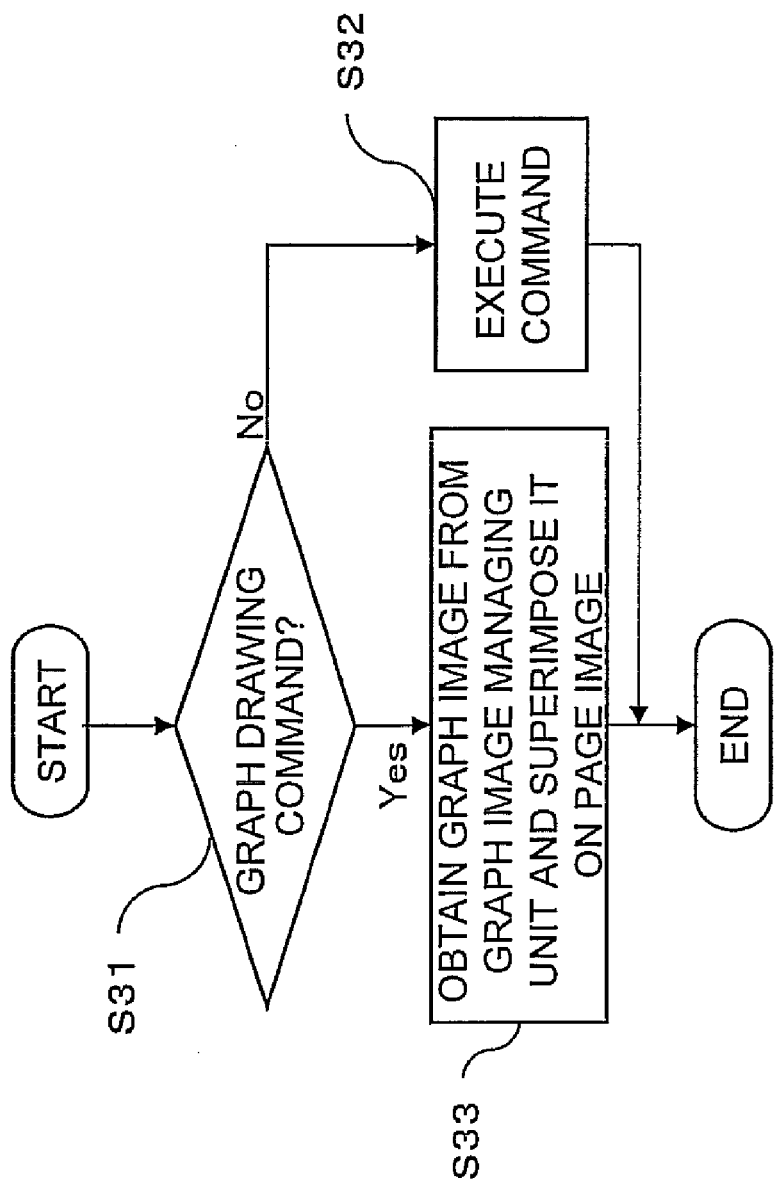
FIG. 7 is a flowchart showing an example of a procedure of a page rendering unit.

The procedure of the page drawing unit 24 that is instructed to execute a command by the variable data processing unit 22 will be described with reference to FIG. 7. First, the page drawing unit 24 determines whether the command passed from the variable data processing unit 22 is a graph drawing command or not (S31). If it is not a graph drawing command, the page drawing unit 24 executes the command (S32). If the obtained command is a command for drawing a character image object, a character string included as an argument is rendered. If the obtained command is a command for rendering a page number, the page number included in the argument is rendered. If the obtained command is a command for instructing to move the current drawing position, the current drawing position is moved to the coordinate indicated by the argument.

If the command received from the variable data processing unit 22 is a graph drawing command served by the graph drawing unit 14, the page drawing unit 24 interrogates the graph image managing unit 50 regarding the set of the graph drawing command and the argument as a graph image identifying key, obtains the graph image corresponding to the key, and superimposes the obtained graph image on the current drawing position of the print page image (S33). As plural graph image generating units 10 generate graph images in parallel, the graph image which the page drawing unit 24 tries to obtain is usually in the graph image managing unit 50 when the page drawing unit 24 tries to obtain the graph image. If the graph image is not in the graph image managing unit 50, the page drawing unit 24 interrogates the graph image managing unit 50 again after a predetermined time. The page drawing unit 24 repeats the interrogation until it can obtain the graph image.

With the above mentioned processing, the page drawing unit 24 generates a printing image including one or more pages for each record. The generated printing image is passed to the printing unit 60. The printing unit 60 prints the received printing image on a sheet of paper. The printing unit 60 may, for example, use a laser printer or an ink jet printer. The printing unit 60 may also use a printing device in the other system. A buffer may be provided between the page drawing unit 24 and the printing unit 60.

Figure 8:
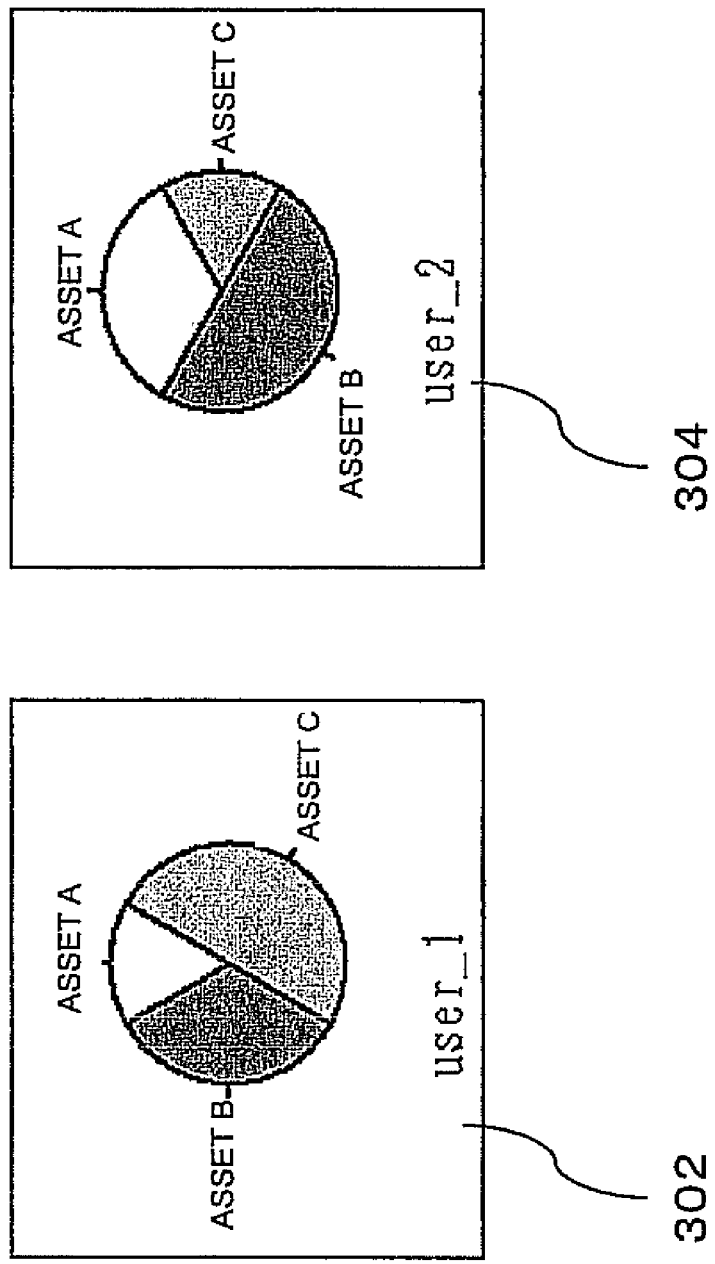
FIG. 8 is a diagram showing an example of a printing image to be generated.

If the layout program Layout0001 in FIG. 2 and the variable data 100 in FIG. 3 are inputted in the image forming device, the printing images 302 and 304 as shown in FIG. 8 are obtained. For example, the printing image 302 is a printing image for a user having the ID of user_1, including a pie chart reflecting the contents of the record of the user_1 and a character string of the ID of the user_1.

In the exemplary embodiment, the graph image generating units 10 operates in parallel, but there is a single page image generating unit 20 that generates the printing image. The single page image generating unit 20 sequentially applies the layout program 200 to each record in the variable data 100, and a printing image according to each record is generated. As there is only one page image generating unit 20, information that should be sequentially allocated from a printing image for the first record in the variable data 100 according to a predetermined rule, such as page numbers, is also correctly allocated to each printing image.

In the above mentioned example, the image processing device has the plural graph image generating units 10 for drawing a pie chart. The image forming device is not limited to such a configuration, and may have plural image generating units, each of which serves each of plural types of images. For example, the image forming device may have plural graph image generating units that serve a pie chart and plural graph image generating units that serve a bar chart. In such a case, the distributing unit 30 distributes divided pieces of data corresponding to the same record to the image generating units of all types of images. A single graph image generating unit may serve plural types of graph drawing commands. For example, in the execution of a single layout program, if the graph image generating unit finds a pie chart drawing command, it may generate a pie chart image, and if it finds a bar graph drawing command, it may generate a bar chart graph image.

Although the divided pieces of data, that are the variable data 100 divided by the number of records, are allocated to each of the graph image generating unit 10 using the round-robin method in the above-mentioned exemplary embodiment, that type of allocation is merely an example. Clustering processing based on nearness of each record may be performed on records in the variable data 100 to divide the records into clusters according to the number of the graph image generating unit in the image forming device. In the clustering processing, a set of values of respective items of the record may be taken as a coordinate in a multidimensional space, and the sets whose coordinates are near may be collected into the same cluster. The distributing unit 30 may generate divided pieces of data by adding the layout instructing command 102 and the record definition 104 to the cluster, and allocate each of the divided pieces of data to each of the graph image generating units. In such a case, a cache is provided in the graph image generating unit. The graph image generating unit 10 stores the result of applying a command to the record in the cache by making a set of the command and the argument a key. When a command is executed, if the result of processing the same key as that of command to be executed is in the cache, the processing result is used. As records belonging to the same cluster have near values, the cache including the values is highly likely to be hit.

Although the layout identifier is described in the variable data 100 in advance in the above mentioned example, that is not necessary. Instead, if a set of the variable data 100 and the layout program 200 is input, the image forming device may add the layout identifier to the layout program 200 and register it in the layout program managing unit 40, and also pass the layout identifier to the distributing unit 30 in association with the variable data 100.

Although drawing of the graph image is processed for each record in parallel in the above mentioned example, an object of the parallel processing is not limited to the graph image. For example, quite a long time is expended in image processing, such as converting a value of an item included in a record (for example, a user name) into a complicated logo image, or embedding the value into another image as a digital watermark using steganography. The units for performing such image processing that take a long time may be parallelized.

Figure 9:
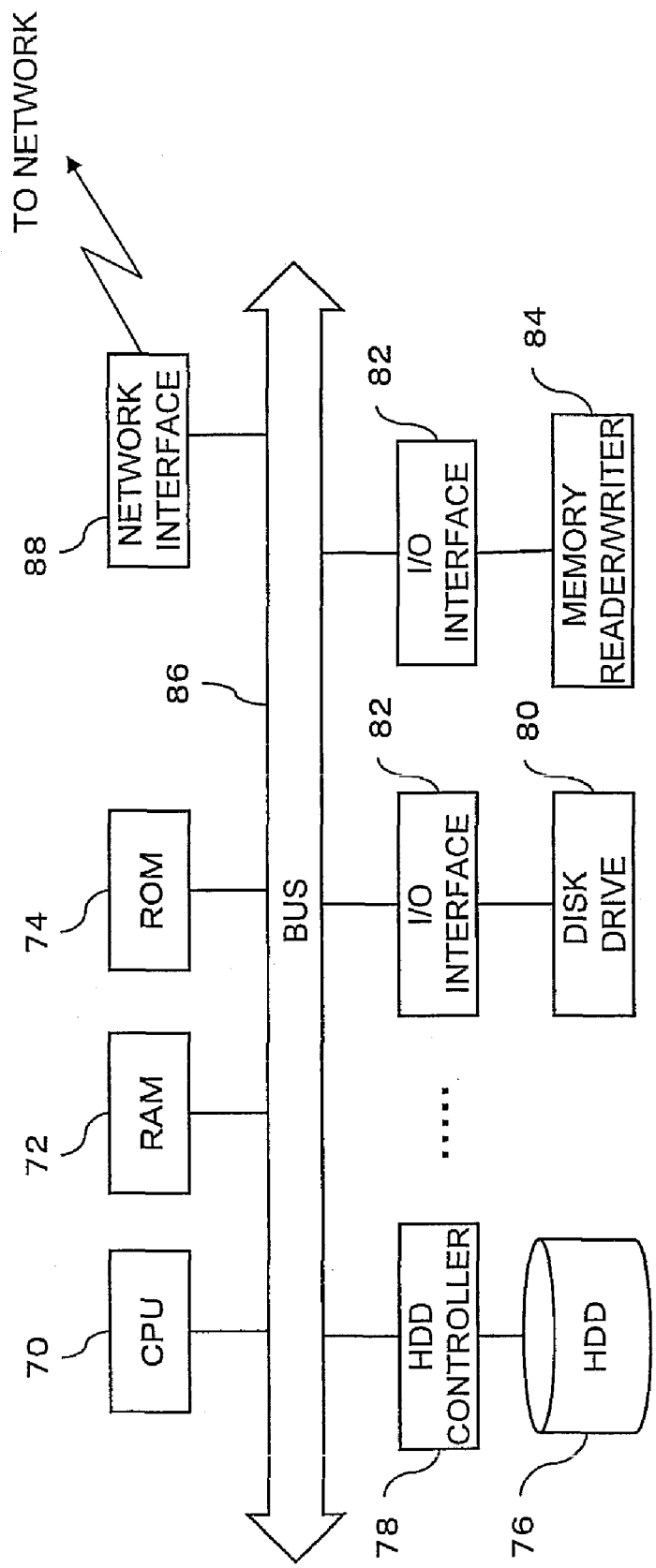
FIG. 9 is a diagram showing an example of a hardware configuration of a control unit of the image forming device.

The parts other than the printing unit 60 exemplified above in the image forming device may be configured as a hardware circuit such as an ASIC (Application Specific Integrated Circuit) or an FPGA (Field Programmable Gate Array) or the like. Alternatively, a part or all of them may be implemented as a software program. If they are implemented as a software program, the control unit of the image forming device only needs to execute a program with the functions or processing contents of each unit described. As shown in FIG. 9, in hardware terms the control unit part has circuitry including a microprocessor such as a CPU 70, a memory (primary storage) such as a random access memory (RAM) 72 and a read only memory (ROM) 74 and the like, a HDD controller 78 for controlling an HDD (hard disk drive) 76, various I/O (input/output) interfaces 82 and a network interface 88 for performing control when connecting with a network such as a local area network connected via a bus 86. A disk drive 80 for reading/writing from/to the transportable disk recording medium such as a CD or a DVD, or a memory reader/writer 84 for reading/writing from/to the transportable nonvolatile recording medium conforming to various standards, such as a flash memory, may be connected to the bus 86 via an I/O interface. The program with the contents of the exemplary embodiment described is stored on a fixed storage device such as a hard disk via a recording medium such as a CD or a DVD, or through communication means such as a network or the like, and installed in the image forming device. The processing of the exemplary embodiment is implemented by reading out the program stored in the fixed storage device to the RAM 72, and executed the program an microprocessor such as the CPU 70 or the like.

A multiprocessor system with plural processors may be used as hardware for efficiently performing the parallel processing. A microprocessor having plural processor cores may also be used. In another example, it is possible to use a technique such as hyper-threading, that makes one physical processor appear as plural logical processors by making use of the free time in a register or a pipeline in the physical processor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A variable data image generating device comprising:
 a receiving unit;
 a distributing unit;
 a plurality of first type image generating units that work in parallel;
 a first type image memory; and
 a document image generating unit, wherein
 the receiving unit receives variable data including an identifier of a rendering program and a plurality of records to which the rendering program is to be applied, the rendering program including a first type rendering instruction to be applied to the plurality of records and a second type rendering instruction different from the first type rendering instruction;
 the distributing unit distributes the entire variable data to the document image generating unit, and also generates, for each record or each group of records included in the variable data, a divided data piece including the record or records and the identifier, and distributes the generated divided data pieces to the respective first type image generating units;
 each of the plurality of first type image generating units obtains the rendering program corresponding to the identifier included in the distributed divided data piece, executes the first type rendering instruction included in the obtained rendering program to generate a first type image corresponding to the record included in the divided data piece, and stores the generated first type image in correlation with the record into the first type image memory;
 the document image generating unit obtains the rendering program corresponding to the identifier included in the variable data, and executes the obtained rendering program for each record in the variable data; and
 during the execution of the rendering program for each record in the variable data, when the document image generating unit finds the first type rendering instruction within the rendering program, the document image generating unit obtains the first type image corresponding to the record from the first type image memory and lays out the obtained first type image, and when the document image generating unit finds the second type rendering instruction within the rendering program, executes the second type rendering instruction and lays out the resulting rendered image.

2. The variable data image generating device according to claim 1, wherein if the first type rendering instruction is executed for a distributed record, the first type image generating unit registers the generated first type image in the first type image memory in association with a set of the first type rendering instruction and the record; and
 if the first type image corresponding to the set of the distributed record and the first type rendering instruction is registered in the first type image memory, the first type image generating unit aborts execution of the first type rendering instruction for the record.

3. The variable data image generating device according to claim 1, wherein the distributing unit performs clustering of records in the variable data according to a distance between records when the set of values of items of the record are set as coordinates of a multi-dimensional space to generate clusters, a number of which corresponds to the number of the first type image generating units, and distributes each of the generated clusters to each of the first type image generating units.

4. A variable data image forming system comprising a variable data image generating device, and a printing device that prints a document image that is generated by a document image generating unit of the variable data image generating device;

said variable data image generating device including,
   a receiving unit,
   a distributing unit,
   a plurality of first type image generating units that work in parallel,
   a first type image memory, and
   a document image generating unit;

wherein the receiving unit receives variable data including an identifier of a rendering program and a plurality of records to which the rendering program is to be applied, the rendering program including a first type rendering instruction to be applied to the plurality of records and a second type rendering instruction different from the first type rendering instruction;

the distributing unit distributes the entire variable data to the document image generating unit, and also generates, for each record or each group of records included in the variable data, a divided data piece including the record or records and the identifier, and distributes the generated divided data pieces to the respective first type image generating units;

each of the plurality of first type image generating units obtains the rendering program corresponding to the identifier included in the distributed divided data piece, executes the first type rendering instruction included in the obtained rendering program to generate a first type image corresponding to the record included in the divided data piece, and stores the generated first type image in correlation with the record into the first type image memory;

the document image generating unit obtains the rendering program corresponding to the identifier included in the variable data, and executes the obtained rendering program for each record in the variable data; and during the execution of the rendering program for each record in the variable data, when the document image generating unit finds the first type rendering instruction within the rendering program, the document image generating unit obtains the first type image corresponding to the record from the first type image memory and lays out the obtained first type image, and when the document image generating unit finds the second type rendering instruction within the rendering program, executes the second type rendering instruction and lays out the resulting rendered image.

5. A tangible computer readable storage medium storing a variable data image generating program causing a computer to function as a variable data image generating device comprising a receiving unit, a distributing unit, a plurality of first type image generating units that work in parallel, a first type image memory, and a document image generating unit, wherein the receiving unit receives variable data including an identifier of a rendering program and a plurality of records to which the rendering program is to be applied, the rendering program including a first type rendering instruction to be applied to the plurality of records and a second type rendering instruction different from the first type rendering instruction;

the distributing unit distributes the entire variable data to the document image generating unit, and also generates, for each record or each group of records included in the variable data, a divided data piece including the record or records and the identifier, and distributes the generated divided data pieces to the respective first type image generating units;

each of the plurality of first type image generating units obtains the rendering program corresponding to the identifier included in the distributed divided data piece, executes the first type rendering instruction included in the obtained rendering program to generate a first type image corresponding to the record included in the divided data piece, and stores the generated first type image in correlation with the record into the first type image memory;

the document image generating unit obtains the rendering program corresponding to the identifier included in the variable data, and executes the obtained rendering program for each record in the variable data; and during the execution of the rendering program for each record in the variable data, when the document image generating unit finds the first type rendering instruction within the rendering program, the document image generating unit obtains the first type image corresponding to the record from the first type image memory and lays out the obtained first type image, and when the document image generating unit finds the second type rendering instruction within the rendering program, executes the second type rendering instruction and lays out the resulting rendered image.

* * * * *